(12) United States Patent
Matsui

(10) Patent No.: US 8,868,750 B2
(45) Date of Patent: Oct. 21, 2014

(54) INFORMATION PROCESSING DEVICE, COMPUTER SYSTEM AND PROGRAM

(75) Inventor: Kazuki Matsui, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 483 days.

(21) Appl. No.: 13/029,663

(22) Filed: Feb. 17, 2011

(65) Prior Publication Data

US 2011/0202921 A1 Aug. 18, 2011

(30) Foreign Application Priority Data

Feb. 17, 2010 (JP) .................................... 2010-32720

(51) Int. Cl.
*G06F 15/173* (2006.01)
*G06F 9/455* (2006.01)
*G06F 9/48* (2006.01)
*H04L 29/08* (2006.01)
*G06F 9/50* (2006.01)

(52) U.S. Cl.
CPC .......... *G06F 9/4856* (2013.01); *H04L 67/2809* (2013.01); *G06F 9/45558* (2013.01); *G06F 9/505* (2013.01); *G06F 9/5077* (2013.01); *G06F 2009/4557* (2013.01)
USPC ................. 709/226; 718/1; 718/105

(58) Field of Classification Search
CPC ... G06F 9/4856; G06F 9/45558; G06F 9/505; G06F 2009/4557; G06F 9/5077; H04L 67/2809
USPC .................. 709/226, 223; 718/1, 105; 711/6; 717/174
See application file for complete search history.

(56) References Cited

U.S. PATENT DOCUMENTS

| 8,364,802 | B1 * | 1/2013 | Keagy et al. .................. 709/223 |
| 2007/0283009 | A1 | 12/2007 | Takemura |
| 2008/0295095 | A1 | 11/2008 | Watanabe et al. |
| 2009/0113109 | A1 * | 4/2009 | Nelson et al. ..................... 711/6 |
| 2010/0211944 | A1 * | 8/2010 | Kaneda ........................ 717/174 |
| 2010/0332658 | A1 * | 12/2010 | Elyashev ..................... 709/226 |
| 2011/0106949 | A1 * | 5/2011 | Patel et al. .................... 709/226 |
| 2011/0161957 | A1 * | 6/2011 | Bernardi et al. ................. 718/1 |

FOREIGN PATENT DOCUMENTS

| JP | 2007-66265 A | 3/2007 |
| JP | 2007-323245 A | 12/2007 |
| JP | 2008-52407 A | 3/2008 |
| JP | 2008-293117 A | 12/2008 |

\* cited by examiner

*Primary Examiner* — Jungwon Chang

(74) *Attorney, Agent, or Firm* — Oblon, Spivak, McClelland, Maier & Neustadt, L.L.P.

(57) ABSTRACT

An information processing device includes: a detecting unit that detects a load of a process performed on the first virtual computer; a load determining unit that determines whether the load detected by the detecting unit is higher than a threshold; and an inhibiting unit that inhibits the process when a second virtual computer to which the first virtual computer is switched operates on the other information processing device and the process that causes the load determined by the load determining unit is performed on the second virtual computer.

13 Claims, 11 Drawing Sheets

FIG. 4

| FILE NAME | DATA AMOUNT |
|---|---|
| DIFFERENCE IMAGE 1 | 15MB |
| DIFFERENCE IMAGE 2 | 5MB |
| DIFFERENCE IMAGE 3 | 3MB |

FIG. 5

| APPLICATION NAME | CONNECTION DEVICE | PORT |
|---|---|---|
| APPLICATION 1 | dm.fujitsu.com | 8080 |
| ⋮ | ⋮ | ⋮ |

FIG. 10

| APPLICATION NAME | CONNECTION DEVICE | PORT | DATA AMOUNT OF DIFFERENCE IMAGE |
|---|---|---|---|
| APPLICATION 1 | dm.fujitsu.com | 8080 | 20MB |
| ⋮ | ⋮ | ⋮ | ⋮ |

INFORMATION PROCESSING DEVICE, COMPUTER SYSTEM AND PROGRAM

CROSS-REFERENCE TO RELATED APPLICATIONS

This application is based upon and claims the benefit of priority of the prior Japanese Patent Application No. 2010-32720, filed on Feb. 17, 2010, the entire contents of which are incorporated herein by reference.

FIELD

The embodiments relate to an information processing device, a computer system, and a program, which allow an application to be executed on a virtual computer that is called a virtual machine (VM).

BACKGROUND

There is a system that causes a plurality of virtual machines to operate on a single server device and assigns the virtual machines to terminal devices, respectively, while the terminal devices are connected to the server device through a network. In the system, operating systems (OSs) operate as the virtual machines that operate on the server device. Users operate the terminal devices so that the terminal devices each use the OS of the virtual machine assigned to the terminal device. In other words, the server device is used as a desktop computer for the terminal devices.

A resource such as a central processing unit (CPU) of the server device is assigned to the multiple virtual machines, and the virtual machines operate. The single resource of the server device is assigned to the multiple virtual machines. Thus, the resource may be insufficient depending on an application executed on the OS of the virtual machine when the application causes a high load. In this case, the virtual machines may not operate or a process speed may be reduced. JP2008-293117 discusses a technique for dynamically changing assignments of the resource on the basis of loads of the virtual machines.

BRIEF DESCRIPTION OF THE DRAWINGS

FIG. 4 is a diagram illustrating a table that is used to manage difference images.
FIG. 5 is a diagram illustrating target application information.
FIG. 10 is a diagram illustrating target application information.

SUMMARY

Figure 1:
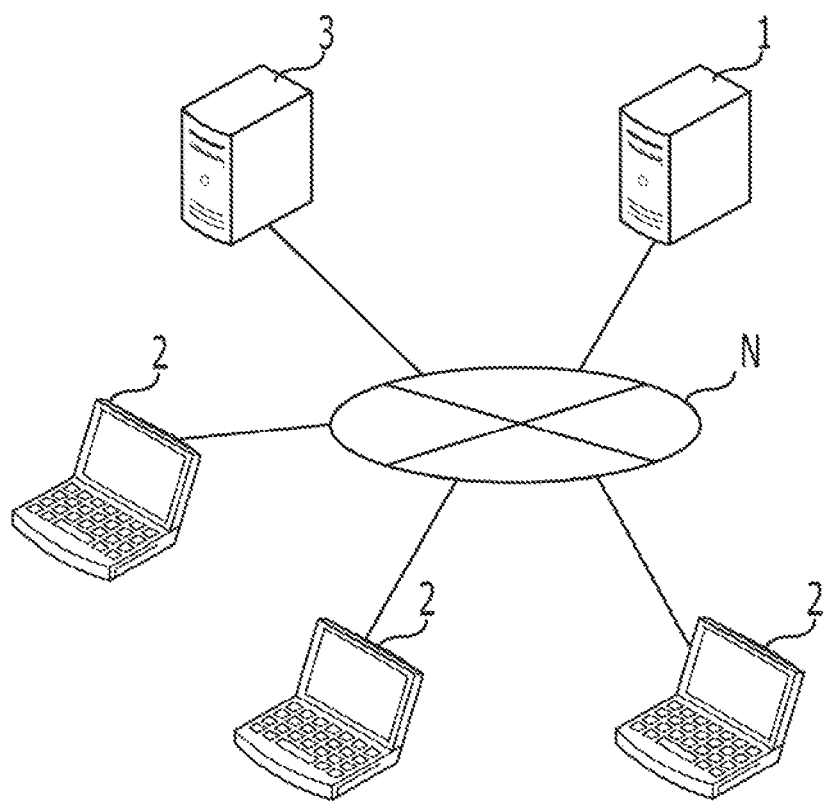
FIG. 1 is a diagram illustrating an embodiment.

According to an aspect of the invention, An information processing device includes: a detecting unit that detects a load of a process performed on the first virtual computer; a load determining unit that determines whether the load detected by the detecting unit is higher than a threshold; and an inhibiting unit that inhibits the process when a second virtual computer to which the first virtual computer is switched operates on the other information processing device and the process that causes the load determined by the load determining unit is performed on the second virtual computer.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Virtual machines each have a function of emulating a hardware environment in which the virtual machine operates, in a similar manner to software. The virtual machines may operate on a server device and terminal devices. In addition, the virtual machines may be transferred between the service device and the terminal devices through a network. Furthermore, the virtual machines may operate on the terminal devices in an environment in which the terminal devices cannot be connected to the server device through the network. However, since each of the terminal devices is any of various devices such as a personal computer and a personal digital assistant (PDA), each of the terminal devices may not have sufficient resources in order to execute an application that causes a high process load, depending on the type of the terminal device. When the virtual machine is operable on the terminal device, and an application that causes a high process load is executed, an error may occur and cause a process to be stopped, or a process speed may be reduced. Since the hardware environment in which the virtual machine operates is emulated by a software process, applications that are executed on an operating system (OS) used as the virtual machine cannot detect the hardware environment (such as a server environment or the terminal device) in which the virtual machine operates.

An information processing device, a computer system and a program are provided, which allow a process to be efficiently performed on a virtual computer regardless of performance of a device on which the virtual computer operates.

An information processing device disclosed herein, on which a first virtual computer that may be used by another information processing device operates, includes: a detecting unit that detects a load of a process performed on the first virtual computer; a determining unit that determines whether or not the load detected by the detecting unit is substantially equal to or higher than a reference value; and an inhibiting unit that inhibits the process when a second virtual computer that has substantially the same information as the first virtual computer operates on the other information processing device and the process that causes the load determined to be substantially equal to or higher than the reference value is performed on the second virtual computer of the other information processing device.

The information processing device disclosed herein inhibits the high-load process performed by the other information processing device. When the other information processing device has low processing performance and performs a high-load process, the information processing device disclosed herein may prevent resources from being exclusively used due to the high-load process and prevent another process from being affected. As a result, the process can be efficiently performed on the virtual computer regardless of the device on which the virtual computer operates.

The information processing device disclosed herein, the computer system disclosed herein and the program disclosed herein are described in the embodiments with reference to the accompanying drawings.

(First Embodiment)

FIG. 1 is a diagram schematically illustrating a computer system according to the first embodiment.

The computer system according to the present embodiment includes a server device 1 and a plurality of terminal devices 2. The server device 1 serves as an information processing device. The server device 1 is connected to the terminal devices 2 via cables or wirelessly through a network N. The network N is a local area network (LAN), a wide area network (WAN) or the like.

A virtual machine monitor (VMM) that serves as a virtual program is executed on the server device 1, while multiple virtual machines (VMs) operate on the VMM. The VMM is a program that assigns resources (such as a CPU and a read-only memory (ROM)) of the server device 1 to the VMs and allows the resources to be used by the VMs. The VMs are virtual computers that each independently execute an OS and an application in a similar manner to a physical computer. The VMs are assigned to the terminal devices 2 connected to the server device 1, respectively, so that the VMs are used by the terminal devices 2 through the network N. The server device 1 may be a personal computer (hereinafter referred to as a PC) that includes a keyboard, a monitor and the like.

The terminal devices 2 are computers that each include a keyboard, a mouse, a monitor and the like. Each of the terminal devices 2 may be a laptop PC, a desktop PC, a set top box (connected to the monitor), a PDA, a mobile phone or the like. The terminal devices 2 are connected to the server device 1 through the network N, while the VMs (hereinafter referred to as server VMs) that operate on the server device 1 are assigned to the terminal devices 2, respectively. The terminal devices 2 may remotely control, through the network N, the VMs assigned to the terminal devices 2, respectively. For example, each of the terminal devices 2 transmits, to the server VM assigned to the terminal device 2, a signal generated by an operation with the keyboard or mouse of the terminal device 2, receives the results of a process from the server VM, and displays the results on the monitor of the terminal device 2. In the following description, the multiple terminal devices 2 have substantially the same configuration. Thus, one of the terminal devices 2 is described below.

A VMM is executed on the terminal device 2 in a similar manner to the server device 1. An application that is the same as the application of the server device 1 is executed on the VMM of the terminal device 2. A VM that has substantially the same information as the server VM of the server device 1 is executed on the VMM of the terminal device 2. The VM that operates on the terminal device 2 is hereinafter referred to as a terminal VM. In an online state in which the terminal device 2 is connected to the server device 1 through the network N, the terminal device 2 uses the server VM. In an offline state in which the terminal device 2 is not connected to the server device 1, the terminal device 2 uses the terminal VM. Thus, even when the terminal device 2 is in the offline state, the terminal device 2 may use the VM. Since the terminal device 2 exclusively uses either the VM of the server device 1 or the VM of the terminal device 2, it is possible to prevent the same VM from being simultaneously used by the server terminal 1 and the terminal device 2.

A management server device 3 is connected to the server device 1 and the terminal device 2 through the network N. The management server device 3 stores data on the application that is executed by the OS that runs on the server VM and the terminal VM. For example, the management server device 3 stores an updater that updates the application. When the server device 1 executes the application, and the application causes a high load, the server device 1 accesses the management server device 3 and downloads the data from the management server device 3 periodically or according to a user operation. In addition, when the terminal device 2 executes the application, and the application causes a high load, the terminal device 2 accesses the management server device 3 and downloads the data from the management server device 3 periodically or according to a user operation. The server device 1 and the terminal device 2 may be connected to the management server device 3 through another network that is different from the network N. In addition, the management server device 3 may be a personal computer that has a CPU and the like. Furthermore, the management server device 3 may be a file server such as network attached storage (NAS).

The same VM and application may be executed on the server device 1 and the terminal device 2. However, in some cases, the VM and the application are smoothly executed on the server device 1 and are not executed on the terminal device 2, depending on a performed process. For example, it is assumed that the terminal device 2 is a PDA or the like that has lower performance than the server device 1 and the application performs a process that causes a high load. In this assumption, the process may be performed by the server device 1 and may not be performed by the terminal device 2 in some cases. This may be due to the fact that resources of the terminal device 2 are not sufficient.

In the present embodiment, when an application that is executed on the server device 1 performs a high-load process, the application is specified as a target application. When the target application is executed on the terminal device 2, the high-load process that is performed by the target application is inhibited. This prevents the resources of the terminal device 2 from being exclusively used by the high-load process and prevents another process from being affected. The first embodiment describes the case in which the management server device 3 is periodically accessed, the data is downloaded from the management server device 3, and an application installed in the OS is specified as the target application.

Next, the computer system is described.

Figure 2:
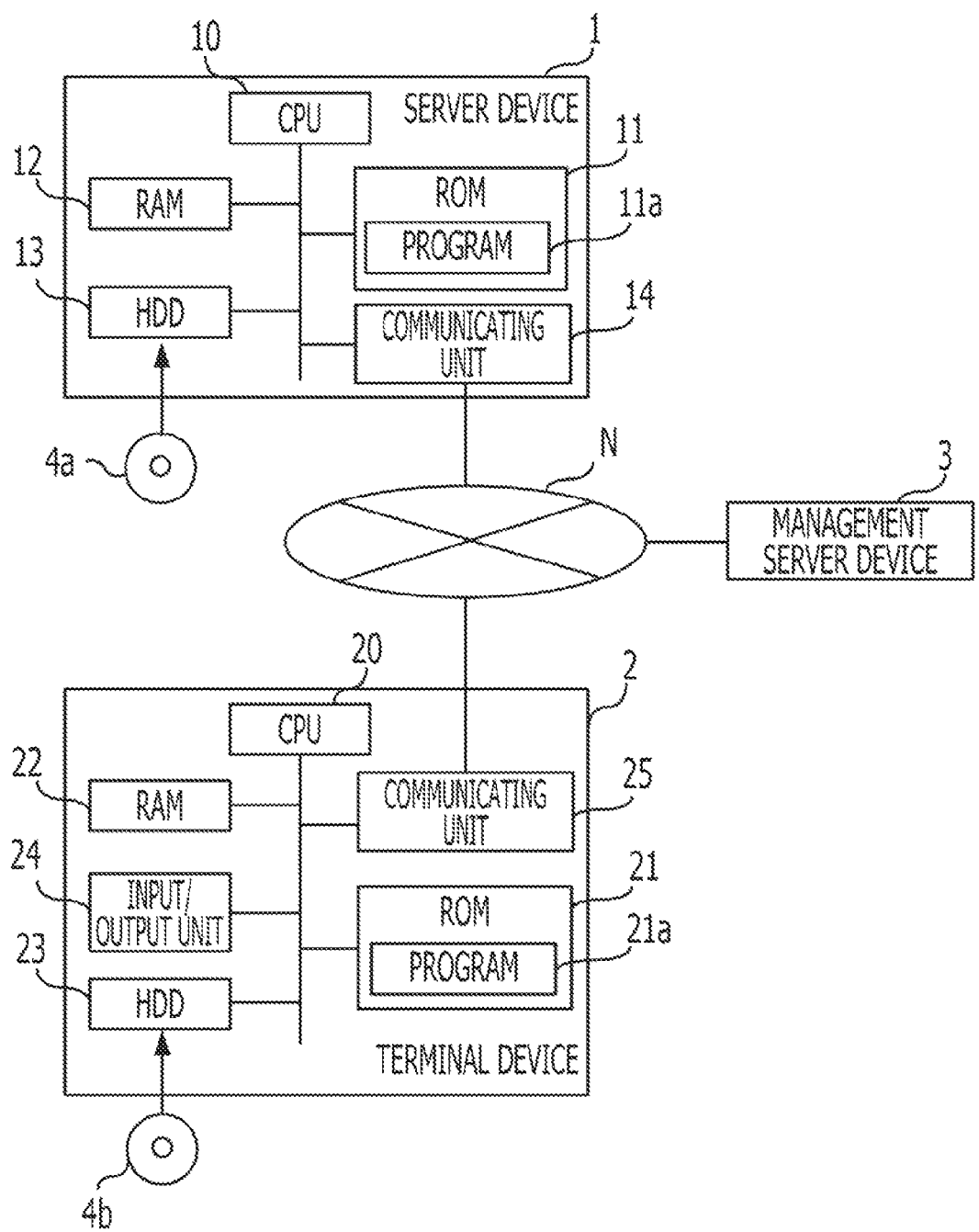
FIG. 2 is a block diagram illustrating a computer system.

FIG. 2 is a block diagram illustrating the computer system.

The server device 1 includes hardware parts that are a CPU 10, a ROM 11, a random access memory (RAM) 12, a hard disk drive (HDD) 13, a communicating unit 14 (ex. 100 Giga Ethernet Card) and the like. The hardware parts of the server device 1 are connected to each other through a bus. The CPU 10 reads a program 11a stored in the ROM 11 into the RAM 12 and executes the program 11a. In addition, the CPU 10 controls operations of the aforementioned hardware parts. Normally, the ROM 11 includes a flash memory, serves as a ROM, and stores the program 11a that is called a BIOS and executed at the time of an initial startup of the server device 1. The RAM 12 is a storage device that is accessed for a short time. The RAM 12 is a static RAM (SRAM), a dynamic RAM (DRAM) or the like, for example. The RAM 12 temporarily stores the program 11a that is executed by the CPU 10. In addition, the RAM 12 temporarily stores various types of data that is generated at the time of execution of the program 11a.

The HDD 13 is a large-capacity storage device. A storage device called a solid state drive (SSD) may be used as the HDD 13. The HDD 13 stores a VMM program, a management OS program, guest OS programs, application programs, data tables and the like. The data tables are used for various types of processes. The programs are each read into the RAM 12 by the CPU 10 and executed by the CPU 10. The programs may be installed in the HDD 13 through an external medium such as a compact disc-ROM (CD-ROM) 4a. In addition, the programs may be downloaded through the network.

The VMM program is a software program that achieves a virtual technique that allows the VMs to operate on the server device 1. The CPU 10 starts operating as the VMM by executing the VMM program after startup of the server device 1. When the CPU 10 operates as the VMM, a virtual environment in which the VMs independently operate is provided to the server device 1.

The management OS program is a software program that achieves a function of starting and stopping the VMs on the VMM and a function of assigning resources such as the CPU 10 to the VMs and releasing the assignments. The CPU 10 starts operating as a management OS by executing the management OS program after the startup of the server device 1.

The guest OS programs are software programs that are each used to execute the OS on an interested VM among the VMs. After the interested VM is executed, the CPU 10 starts operating as the OS (hereinafter referred to as guest OS) by executing the guest OS program. The guest OS is Windows (registered trademark), Linux (registered trademark) or the like, for example. The guest OS generates data regarding a display screen on the basis of a performed process, while the display screen includes a character user interface (CUI), a graphic user interface (GUI) and the like, which are to be displayed. The generated data regarding the display screen is transmitted to the terminal device 2, and the display screen is displayed on the monitor of the terminal device 2. The guest OS receives control signals generated on the basis of operations with the keyboard and mouse of the terminal device 2. The guest OS performs various types of processes on the basis of the received control signals.

The application programs are software programs that are executed on the guest OSs, respectively. The server device 1 may read the application programs from an external memory that has, stored therein, the application programs, and the server device 1 may store the application programs in the large-capacity storage device 13. In addition, the server device 1 may download the application programs through the network and store the application programs in the HDD 13.

The terminal device 2 includes hardware parts that are a CPU 20, a ROM 21, a RAM 22, a HDD 23, an input/output unit 24, a communicating unit 25 and the like. The hardware parts of the terminal device 2 are connected to each other through a bus. The input/output unit 24 includes a keyboard, a mouse, a monitor and the like. The communicating unit 25 is connected to the network N and communicates with the devices connected to the network N.

The CPU 20 reads a program 21a stored in the ROM 21 into the RAM 22 and executes the program 21a when desired or necessary. The CPU 20 controls operations of the aforementioned hardware parts. The ROM 21 has, stored therein, the program 21a, various types of data, and the like. The RAM 22 is a SRAM, a DRAM, a flash memory or the like, for example. The RAM 22 temporarily stores various types of data that is generated at the time of execution of the control program 21a. The control program 21a is executed by the CPU 20.

The HDD 23 has, stored therein, a VMM program, a management OS program, a guest OS program, an application program, various types of data and the like in a similar manner to the server device 1. These programs may be installed in the HDD 23 through an external medium such as a CD-ROM 4b or may be downloaded through the network.

The server device 1 and the terminal device 2, which are included in the computer system, are described below.

Figure 3:
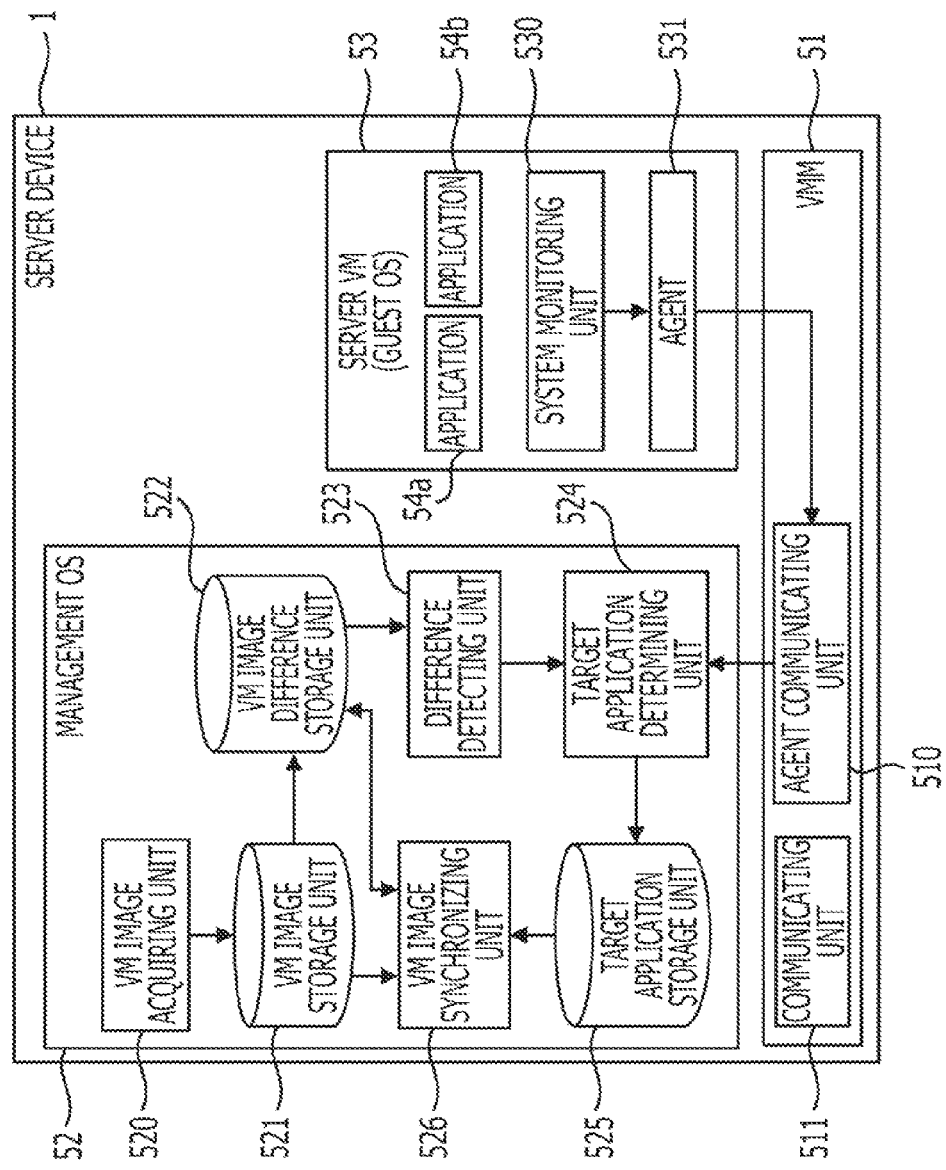
FIG. 3 is a block diagram illustrating a server device.

FIG. 3 is a block diagram illustrating functions that are included in the server device 1.

When power is supplied to the server device 1, and the hardware of the server device 1 completely starts up, the CPU 10 first starts operating as the VMM (designated by reference numeral 51) by reading the VM program from the HDD 13 and executing the VM program. After the CPU 10 operates as the VMM 51, the CPU 10 starts operating as the management OS (designated by reference numeral 52) by reading the management OS program from the HDD 13 and executing the management OS program. The VMM 51 starts and stops the server VMs (designated by reference numeral 53) on the VMM 51 on the basis of a request from the management OS 52. The multiple server VMs 53 operate on the VMM 51. One of the servers VMs 53 is illustrated in FIG. 3 and described below.

In order to execute the server VM 53, the management OS 52 performs a user authentication. For example, in the server device 1, the ID of a user, a password, and information on the server VM 53 to be used by the user are registered in a management table, while the user ID, the password and the information on the server VM 53 are associated with each other in the management table. The management OS 52 transmits information on a login screen (not illustrated) to the terminal device 2. A user ID and a password are entered in the terminal device 2 according to the login screen displayed on the terminal device 2. Then, the management OS 52 receives the entered user ID and the entered password from the terminal device 2. The management OS 52 determines whether or not the management table has, registered therein, the received user ID and the received password. When the management table has, registered therein, the received user ID and the received password, the management OS 52 determines that the user is authenticated, and the VMM 51 executes the server VM 53 corresponding to the user ID registered in the management table and assigns resources to the executed server VM 53.

In the executed server VM 53, the guest OS starts being executed. Multiple applications such as applications 54a, 54b may be executed on the guest OS. The guest OS has functions that are a system monitoring unit 530 and an agent 531. The system monitoring unit 530 acquires information (hereinafter referred to as application information) on the application that is being executed on the guest OS. The application information includes information (e.g., the name of an executable file) that specifies the application. In addition, the application information includes information on a process that is performed by the application. For example, when the application performs network communication, the system monitoring unit 530 acquires the following information as the application information: an I/O port to be accessed; an I/O access amount (indicating traffic to the I/O port); a device (hereinafter also referred to as a connection device) that is connected to the application; the amount of data in the network; and the like. The agent 531 transmits the application information acquired by the system monitoring unit 530 to the VMM 51.

The VMM 51 includes functions that are an agent communicating unit 510 and a communicating unit 511. The agent communicating unit 510 receives the application information from the server VM 53 and transmits the application information to the management OS 52. The communicating unit 511 performs network communication on the basis of the application information received by the agent communicating unit 510. For example, the communicating unit 511 communicates with the management server device 3.

The management OS 52 includes functions that are a VM image acquiring unit 520, a VM image storage unit 521, a VM image difference storage unit 522, a difference detecting unit 523, a target application determining unit 524, a target application storage unit 525 and a VM image synchronizing unit 526.

The VM image acquiring unit 520 acquires a VM image of the server VM 53 at substantially constant time intervals (e.g., 60 seconds) and causes the acquired VM images to be stored in the VM image storage unit 521. The VM images are so-called snapshots of the server VM 53 and information (such as an image of a memory, an image of a disk) on the states of the VM at certain times. Every time the VM image acquiring unit 520 acquires a VM image of the server VM 53, the VM image storage unit 521 may rewrite the VM image and store the VM image. In addition, the VM image storage unit 521 may accumulate the VM images acquired by the VM image acquiring unit 520 and store the VM images.

The VM image difference storage unit 522 stores the difference between VM images that has been acquired by the VM image acquiring unit 520 at different times. For example, the VM image acquiring unit 520 acquires a VM image at a certain time and causes the acquired VM image to be stored in the VM image storage unit 521. Then, the difference between the VM image acquired by the VM image acquiring unit 520 at the certain time and another VM image already stored in the VM image storage unit 521 is stored in the VM image difference storage unit 522. The VM image difference storage unit 522 stores a VM image (hereinafter referred to as a difference image) of the difference (detected by the difference detecting unit 523) and the data amount of the difference image. When the guest OS of the server VM 53 performs a high-load process, the data amount of the difference image is increased.

FIG. 4 is a diagram schematically illustrating a table that is used to manage difference images. The table illustrated in FIG. 4 is used to manage difference images stored in the VM image difference storage unit 522. The difference images and the data amounts of the difference images are stored in the table in chronological order of detection of the difference images. For example, a difference image (difference image 1) that is first detected by the difference detecting unit 523 has a data amount of 15 Mbytes. A difference image (difference image 2) that is next detected by the difference detecting unit 523 has a data amount of 5 Mbytes. The VM image difference storage unit 522 may accumulate and store the difference images as illustrated in FIG. 4. In addition, the VM image difference storage unit 522 may rewrite the difference images over difference images already stored in the VM image difference storage unit 522.

Every time a difference image is stored in the VM image difference storage unit 522, the difference detecting unit 523 determines whether or not the data amount of the difference image is substantially equal to or larger than a threshold (e.g., 10 Mbytes). When the difference detecting unit 523 determines that the data amount of the difference image is substantially equal to or larger than the threshold, the difference detecting unit 523 determines that a high-load process has been performed by the server VM 53, and the difference detecting unit 523 notifies the target application determining unit 524 of the determination result. The threshold may be changed on the basis of processing performance of the terminal device 2. For example, when the terminal device 2 has high processing performance, the threshold may be increased so that the possibility to specify the application as the target application is reduced.

The target application determining unit 524 receives the application information from the agent communicating unit 510 of the VMM 51. When the target application determining unit 524 is notified by the difference detecting unit 523, the target application determining unit 524 acquires the I/O access amount or the amount of data in the network from the received application information. When the acquired I/O access amount or the acquired amount of data in the network is substantially equal to or larger than a threshold (2 to 3 Mbytes/minute in the case of the I/O access amount or 100 to 500 kbp/minute in the case of the amount of data in the network), the target application determining unit 524 determines, as the target application, the application that is being executed at the time of the acquisition of the I/O access amount or at the time of the acquisition of the amount of data in the network.

When the target application determining unit 524 determines the application as the target application, the target application determining unit 524 extracts information (hereinafter referred to as target application information) on the target application from the application information and causes the extracted target application information to be stored in the target application storage unit 525. FIG. 5 is a diagram schematically illustrating the target application information. The target application information includes the name (application name) of the target application; the address of a connection device (e.g., management server device 3) that is connected to the target application; and an I/O port that is used by the target application.

The VM image synchronizing unit 526 synchronizes the VM images between the server device 1 and the terminal device 2. In order to perform the synchronization of the VM images, the VM image synchronizing unit 526 first transmits one of the VM images to the terminal device 2. After that, the VM image synchronizing unit 526 transmits the difference between the previously transmitted VM image and another one of the VM images to the terminal device 2. When the VM image synchronizing unit 526 receives a difference image from the terminal device 2, the VM image synchronizing unit 526 causes the received difference image to be stored in the VM image difference storage unit 522. Since the VM image synchronizing unit 526 synchronizes the VM images between the server device 1 and the terminal device 2, the server device 1 and the terminal device 2 hold the same VM images. Thus, the same VM and application may be executed on the server device 1 and the terminal device 2. The VM image synchronizing unit 526 transmits the target application information stored in the target application storage unit 525 to the terminal device 2 at the time of the synchronization of the VM images. Since the VM image synchronizing unit 526 transmits the target application information to the terminal device 2 at the time of the synchronization, it is not necessary to establish communication between the server device 1 and the terminal device 2 only in order to transmit the target application information.

Figure 6:
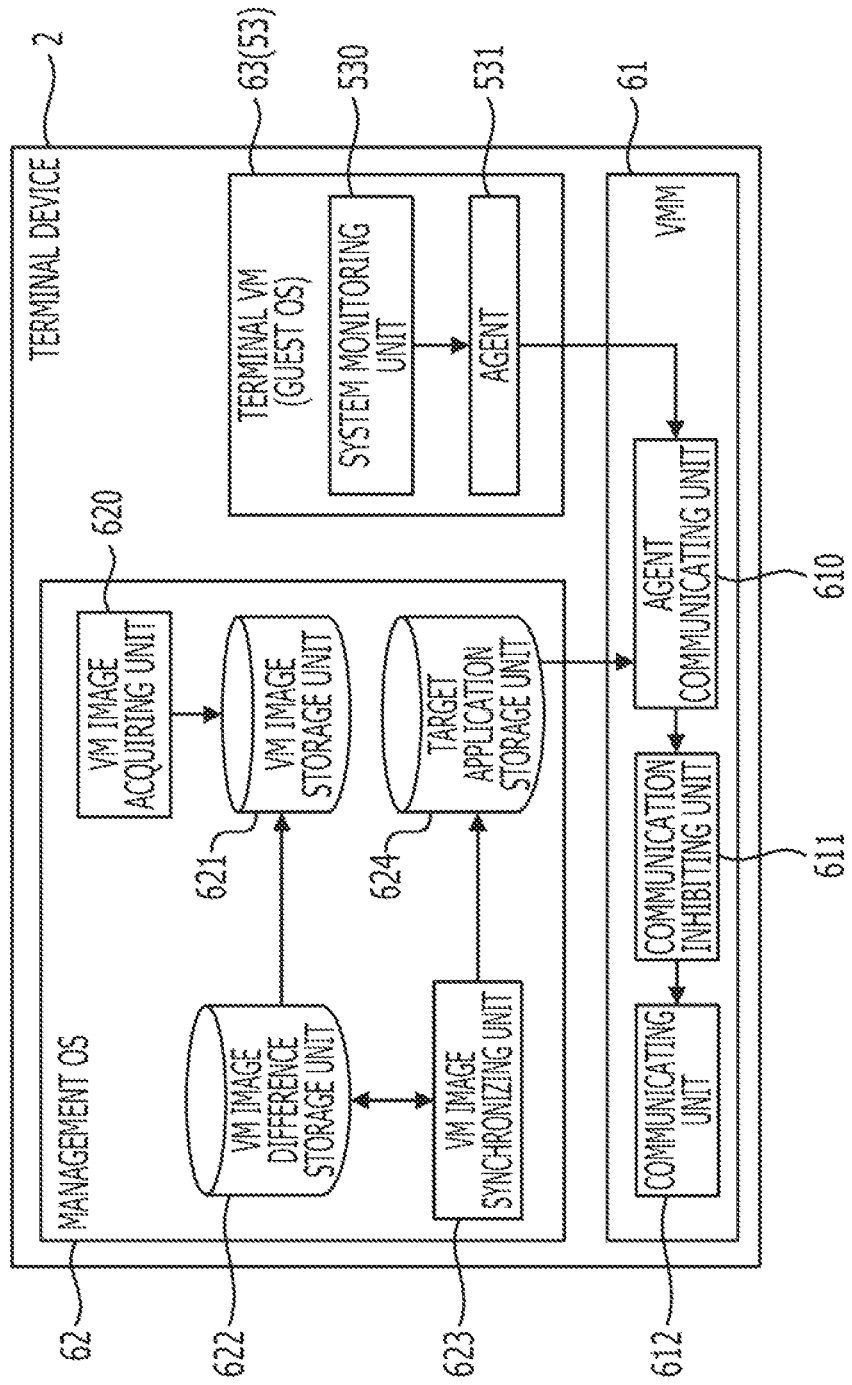
FIG. 6 is a block diagram illustrating a terminal device.

FIG. 6 is a block diagram illustrating functions that are included in the terminal device 2.

When power is supplied to the terminal device 2 and the hardware of the terminal device 2 completely starts up, the CPU 20 first starts operating as the VMM (designated by reference numeral 61) by reading the VMM program from the HDD 23 and executing the VMM program. After the terminal device 2 operates as the VMM 61, the terminal device 2 starts operating as a management OS 62 by reading the management OS program from the HDD 23 and executing the management OS program.

The management OS 62 performs the aforementioned user authentication between the server device 1 and the terminal device 2. When the user authentication is successfully completed, the management OS 62 accesses the corresponding server VM 53 using image transfer protocol such as Remote Desktop Protocol (RDP). Thus, the terminal device 2 remotely controls the server VM 53 of the server device 1.

When the terminal device 2 is in the offline state, the VMM 61 starts and stops the terminal VM 63 on the basis of a request from the management OS 62. In order for the user to set the terminal device 2 to be in the offline state, the management OS 62 may receive information on a user operation and execute the terminal VM 63 according to the information on the user operation. In addition, the management OS 62 may automatically detect that the terminal device 2 is in the offline state, and the management OS 62 may execute the terminal VM 63. The executed terminal VM 63 has substantially the same functions as the aforementioned server VM 53. FIG. 6 illustrates the case where the terminal VM 53 is operating. However, when the terminal device 2 is in the online state and the server VM 53 is being used, the terminal VM 63 does not operate.

The management OS 62 includes functions that are a VM image acquiring unit 620, a VM image storage unit 621, a VM image difference storage unit 622, a VM image synchronizing unit 623 and a target application storage unit 624. The VM image acquiring unit 620 acquires a VM image of the terminal VM 63 at substantially constant time intervals (e.g., 60 seconds) and causes the acquired VM images to be stored in the VM image storage unit 621. The VM image difference storage unit 622 stores the difference (difference image) between the VM images that has been acquired by the VM image acquiring unit 620 at different times.

The VM image synchronizing unit 623 and the VM image synchronizing unit 526 of the server device 1 synchronize the difference image. When the VM image synchronizing unit 623 receives the difference image from the server device 1, the VM image synchronizing unit 623 causes the difference image to be stored in the VM image difference storage unit 622. When the terminal VM 63 is used in the terminal device 2 and the difference image is stored in the VM image difference storage unit 622, the VM image synchronizing unit 623 transmits the difference image to the server device 1. The VM image synchronizing unit 623 causes the target application information transmitted with the VM images from the server device 1 to be stored in the target application storage unit 624.

The VMM 61 includes functions that are an agent communicating unit 610, a communication inhibiting unit 611 and a communicating unit 612. The agent communicating unit 610 receives the application information from the agent 531 of the terminal VM 63 and receives the target application information stored in the target application storage unit 624. When the application that is executed on the terminal VM 63 is the target application, and the target application performs network communication with the connection device described in the target application information, the agent communication unit 610 instructs the communication inhibiting unit 611 to inhibit the network communication. The communication inhibiting unit 611 inhibits, on the basis of the instruction from the agent communicating unit 610, the network communication that is performed by the communicating unit 612.

Next, an operating process that is performed by the computer system according to the present embodiment is described with reference to flowcharts.

Figure 7:
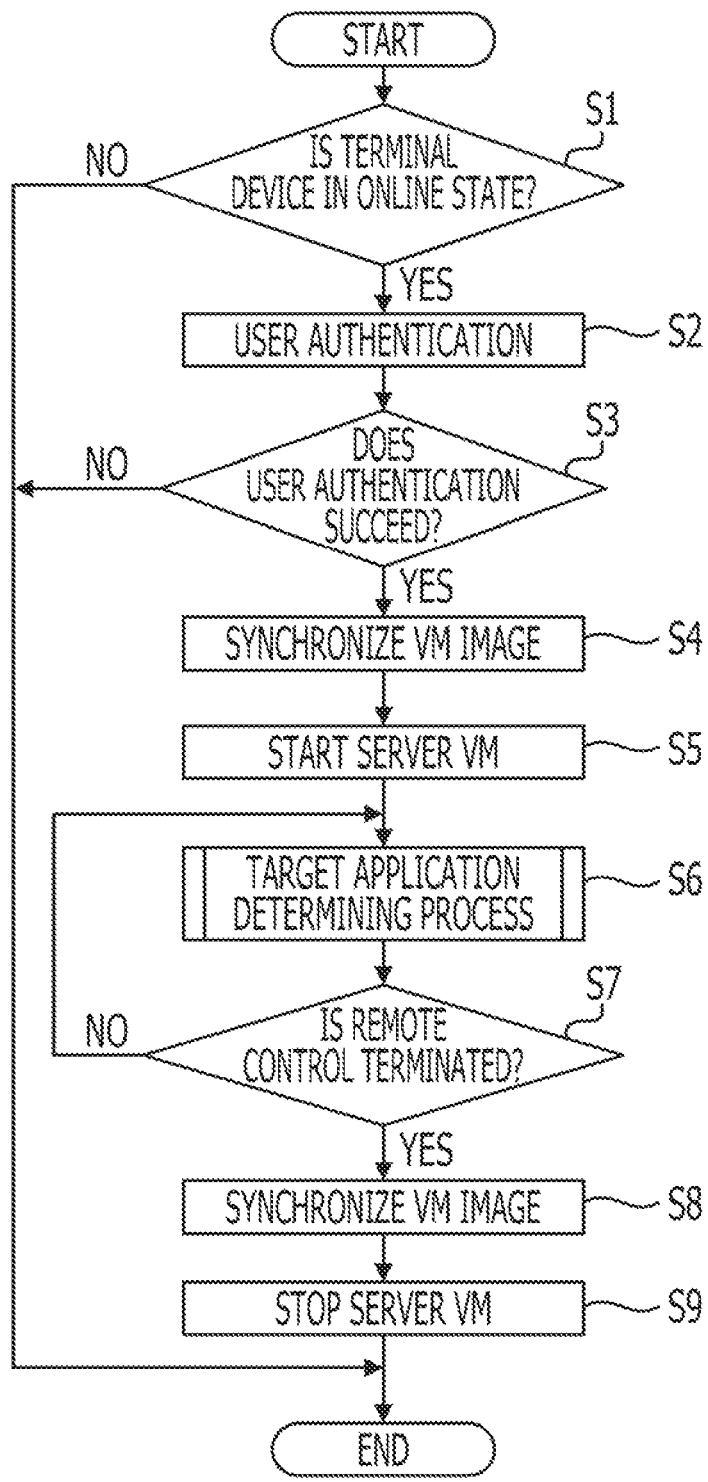
FIG. 7 is a flowchart of a process that is performed by the server device.

FIG. 7 is a flowchart of a process that is performed by the server device 1 when the terminal device 2 is in the online state.

When power is supplied to the server device 1 and the hardware of the server device 1 completely starts up, the CPU 10 of the server device 1 executes the VMM program and starts the VMM 51. After the CPU 10 starts the VMM 51, the CPU 10 executes the management OS program and then executes the management OS 52. The executed management OS 52 determines whether or not the terminal device 2 is in the online state (in operation S1). For example, when the server device 1 transmits a signal to the terminal device 2 and receives a signal transmitted in response to the signal transmitted by the server device 1, the management OS 52 determines that the terminal device 2 is in the online state. The management OS 52 may determine that the terminal device 2 is in the online state on the basis of a user operation. When the terminal device 2 is not in the online state (No in operation S1), the management OS 52 terminates the process.

When the terminal device 2 is in the online state (Yes in operation S1), the management OS 52 performs the user authentication (in operation S2) and determines whether or not the user authentication succeeds (in operation S3). For example, the management OS 52 transmits screen information to the terminal device 2 in order to display the login screen on the monitor of the terminal device 2. Then, a user ID and a password are entered in the terminal device 2 according to the login screen displayed on the terminal device 2. Then, the management OS 52 receives the entered user ID and the entered password from the terminal device 2 and determines whether or not the management table has, registered therein, the received user ID and the received password.

When the user authentication does not succeed (No in operation S3), the management OS 52 terminates the process. In this case, the management OS 52 transmits information on an error notification screen to the terminal device 2. When the user authentication succeeds (Yes in operation S3), the management OS 52 synchronizes the VM images between the server device 1 and the terminal device 2 (in operation S4). In order to perform the synchronization of the VM images, the management OS 52 first transmits one of the VM images to the terminal device 2. After that, the management OS 52 transmits the difference between the previously transmitted VM image and another one of the VM images to the terminal device 2 or receives the difference image from the terminal device 2 and holds the same VM images as the server device 1.

Next, the management OS 52 starts the server VM 53 that corresponds to the authenticated user ID (in operation S5). Thus, the guest OS is executed on the server VM 53, and the server VM 53 starts being remotely controlled by the terminal device 2. For example, the management OS 52 may transmit an address to the terminal device 2 in order for the terminal device 2 to access the executed guest OS, and the terminal device 2 may access the server VM 53. Then, the server VM 53 receives information on a user operation from the terminal device 2 and transmits, to the terminal device 2, information on a screen to be displayed as a result of the reception of the information on the user operation.

Figure 8:
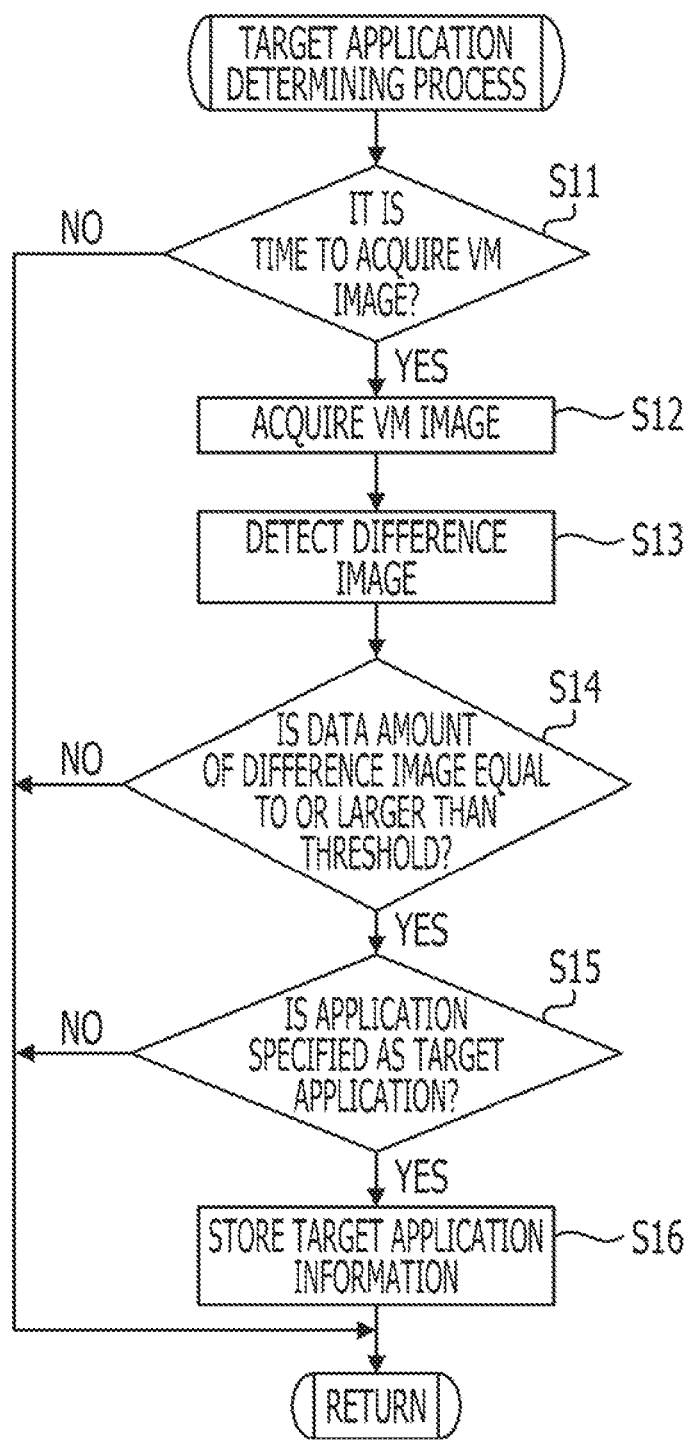
FIG. 8 is a flowchart of a target application determining process.

The management OS 52 performs a target application determining process (in operation S6). The target application determining process is performed to determine whether or not the application that is executed on the guest OS of the server VM 53 is specified as the target application. FIG. 8 is a flowchart of the target application determining process.

The management OS 52 determines whether or not it is time to acquire a VM image of the server VM 53 (in operation S11). For example, the management OS 52 determines whether or not 60 seconds elapse after previous acquisition of a VM image. When the management OS 52 determines that it is not time to acquire the VM image of the server VM 53 (No in operation S11), the management OS 52 terminates the process illustrated in FIG. 8 and performs operation S7 of the process illustrated in FIG. 7. When the management OS 52 determines that it is time to acquire the VM image of the server VM 53 (Yes in operation S11), the management OS 52 acquires the VM image of the server VM 53 (in operation S12) and detects the difference between the acquired VM image and the previously acquired VM image (in operation S13).

Next, the management OS 52 determines whether or not the data amount of the detected difference image is substantially equal to or larger than the threshold (e.g., 10 Mbytes) (in operation S14). When the data amount of the detected difference image is smaller than the threshold (No in operation S14), the management OS 52 terminates the process illustrated in FIG. 8. When the data amount of the detected difference image is substantially equal to or larger than the threshold (Yes in operation S14), the management OS 52 determines whether or not the application that is being executed on the server VM 53 is specified as the target application (in operation S15). For example, the management OS 52 receives the application information from the server VM 53 and determines, on the basis of the application information, whether or not the I/O access amount or the amount of data in the network is substantially equal to or larger than the threshold. When the I/O access amount or the amount of data in the network is substantially equal to or larger than the threshold, the management OS 52 specifies, as the target application, the application that is being executed. When the management OS 52 does not specify the application as the target application (No in operation S15), the management OS 52 terminates the process. When the management OS 52 specifies the application as the target application (Yes in operation S15), the management OS 52 stores the target application information (in operation S16) and terminates the process.

The thresholds used in operations S14 and S15 in order to specify the application as the target application may be set on the basis of performance of the terminal device 2 or the usage states of the resources of the terminal device 2. For example, when the performance of the terminal device 2 is high, the thresholds are set to large values so that the number of applications to be specified as target applications is small. On the other hand, when the performance of the terminal device 2 is low, the thresholds are set to small values so that the number of applications to be specified as target applications is large. Thus, the terminal device 2 inhibits the network communication in a flexible manner.

After the target application determining process is terminated, the management OS 52 determines whether or not the remote control is terminated (in operation S7). When the terminal device 2 receives information on a user operation such as an operation of turning off a power button, and the terminal device 2 notifies the management OS 52 of termination of the remote control, the management OS 52 determines that the remote control is terminated. When the management OS 52 determines that the remote control is not terminated (No in operation S7), the management OS 52 causes the terminal device 2 to continue the remote control and performs the target application determining process in operation S6. When the management OS 52 determines that the remote control is terminated (Yes in operation S7), the management OS 52 synchronizes the VM images between the server device 1 and the terminal device 2 (in operation S8). When the target application information is stored before the synchronization of the VM images, the target application information is transmitted to the terminal device 2 at the time of the synchronization. Thus, a VM image changed by the remote control is reflected in the terminal device 2, and the management OS 52 notifies the terminal device 2 of the target application. Then, the management OS 52 stops the server VM 53 (in operation S9) and terminates the process.

Figure 9:
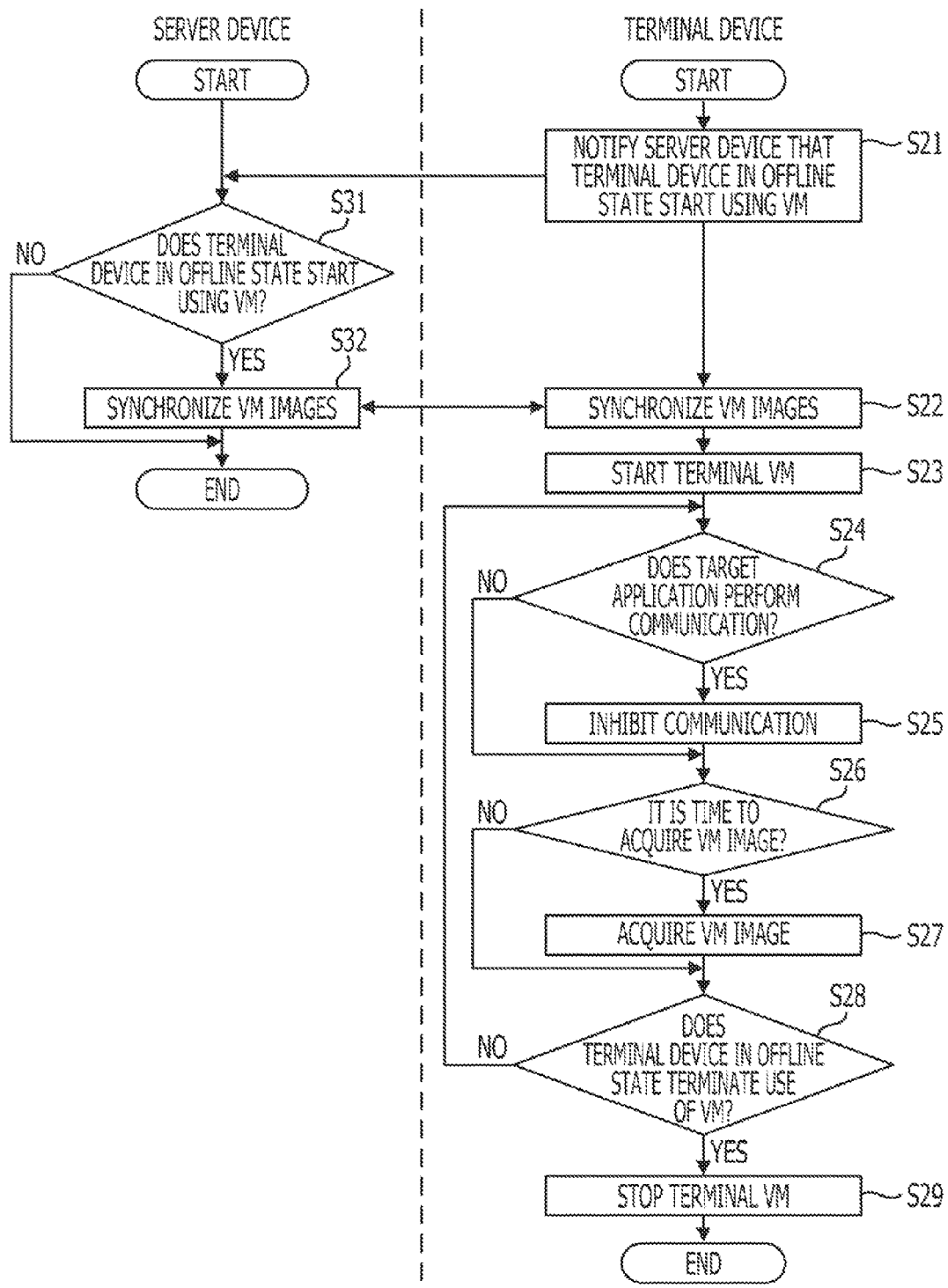
FIG. 9 is a flowchart of a process that is performed by the terminal device.

FIG. 9 is a flowchart of a process that is performed by the terminal device 2 that is in the offline state. FIG. 9 also illustrates a process that is performed by the server device 1 together with the process that is performed by the terminal device 2.

The management OS 62 of the terminal device 2 notifies the server device 1 that the terminal device 2 in the offline state starts using the VM (in operation S21). The management OS 62 of the terminal device 2 in the offline state may start using the VM by receiving information on a user operation. In addition, the management OS 62 may start using the VM by detecting that the state of the terminal device 2 is changed to the offline state due to disconnection of a cable or the like. In the server device 1, the management OS 52 determines whether or not the terminal device 2 notifies the management OS 52 that the terminal device 2 in the offline state starts using the VM (in operation S31). When the management OS 52 is not notified by the terminal device 2 (No in operation S31), the management OS 52 terminates the process. When the management OS 52 is notified by the terminal device 2 (Yes in operation S31), the management OS 52 of the server device 1 and the management OS 62 of the terminal device 2 synchronizes the VM images (in operations S22 and S32).

Next, the management OS 62 of the terminal device 2 starts the terminal VM 63 (in operation S23). The terminal VM 63 may be used while the terminal device 2 is in the offline state. For example, after the management OS 62 starts the terminal VM 63, the guest OS is executed on the terminal VM 63. The management OS 62 is connected to the guest OS that runs on the terminal VM 63. The management OS 62 receives information on a user operation and transmits the received information to the guest OS that runs on the terminal VM 63. The management OS 62 receives information on a screen to be displayed as a result of the reception of the information on the user operation and causes the information to be displayed on the monitor of the terminal device 2.

After the guest OS is executed, the VMM 61 monitors the application that is executed on the guest OS. The VMM 61 determines whether or not the application that that is executed on the guest OS is the target application and performs network communication (in operation S24). For example, the VMM 61 acquires the target application information from the management OS 62 and determines whether or not the target application that is executed on the terminal VM 63 has accessed the connection device described in the target application information. When the target application does not perform the network communication (No in operation S24), operation S26 is performed. When the target application performs the network communication (Yes in operation S24), the VMM 61 inhibits the network communication that is performed by the target application (in operation S25). The VMM 61 may prohibit the network communication in operation S25. In addition, when another process is performed during operation S25, the other process may be performed on a priority basis and the network communication may be performed after the other process. Therefore, a high-load process is not performed in the terminal device 2, and it is possible to avoid preventing another process from being performed in the terminal device 2.

Next, the management OS 62 determines whether or not it is time to acquire a VM image of the terminal VM 63 (in operation S26). For example, the management OS 62 determines whether or not 60 seconds elapse after previous acquisition of a VM image. When the management OS 62 determines that it is not time to acquire the VM image of the terminal VM 63 (No in operation S26), the management OS 62 performs operation S28. When the management OS 62 determines that it is time to acquire the VM image of the terminal VM 63 (Yes in operation S26), the management OS 62 acquires the VM image of the terminal VM 63 (in operation S27).

The management OS 62 determines whether or not the terminal device 2 in the offline state terminates the use of the terminal VM 63 (in operation S28). When the management OS 62 receives information on a user operation such as an operation of turning off the power button or an instruction to connect the terminal device 2 to the server device 1, the management OS 62 determines that the terminal device 2 in the offline state terminates the use of the terminal VM 63. When the terminal device 2 in the offline state does not terminate the use of the terminal VM 63 (No in operation S28), the management OS 62 causes the terminal device 2 in the offline state to continuously use the terminal VM 63, and operation S24 is performed. When the terminal device 2 in the offline state terminates the use of the terminal VM 63 (Yes in operation S28), the management OS 62 stops the terminal VM 63 (in operation S29) and terminates the process.

As described above, in the present embodiment, when the application specified as the target application performs the network communication to access the management server device 3, the network communication is inhibited. Thus, even when the terminal device 2 has low processing performance, for example, when the terminal device 2 is a PDA or the like, an application that performs a high-load process (exclusively using most parts of the resources of the terminal device 2) does not affect another process. Therefore, a process is efficiently performed on the virtual computer regardless of performance of the device on which the virtual computer operates.

(Second Embodiment)

The second embodiment is described below. In the second embodiment, the terminal device 2 determines whether or not network communication is inhibited. The determination is described below.

FIG. 10 is a diagram schematically illustrating target application information. The target application information according to the present embodiment includes: the name (application name) of a target application; the address of a connection device (e.g., management server device 3) that is connected to the target application; an I/O port to be used by the target application; and the data amount of a difference image. After the difference detecting unit 523 determines that the data amount of the difference image is substantially equal to or larger than the threshold and the difference detecting unit 523 notifies the target application determining unit 524 of the data amount of the difference image, the data amount of the difference image is included in the target application information. The target application information is transmitted to the terminal device 2 in order for the VM image synchronizing unit 526 to synchronize the VM images between the server device 1 and the terminal device 2.

Figure 11:
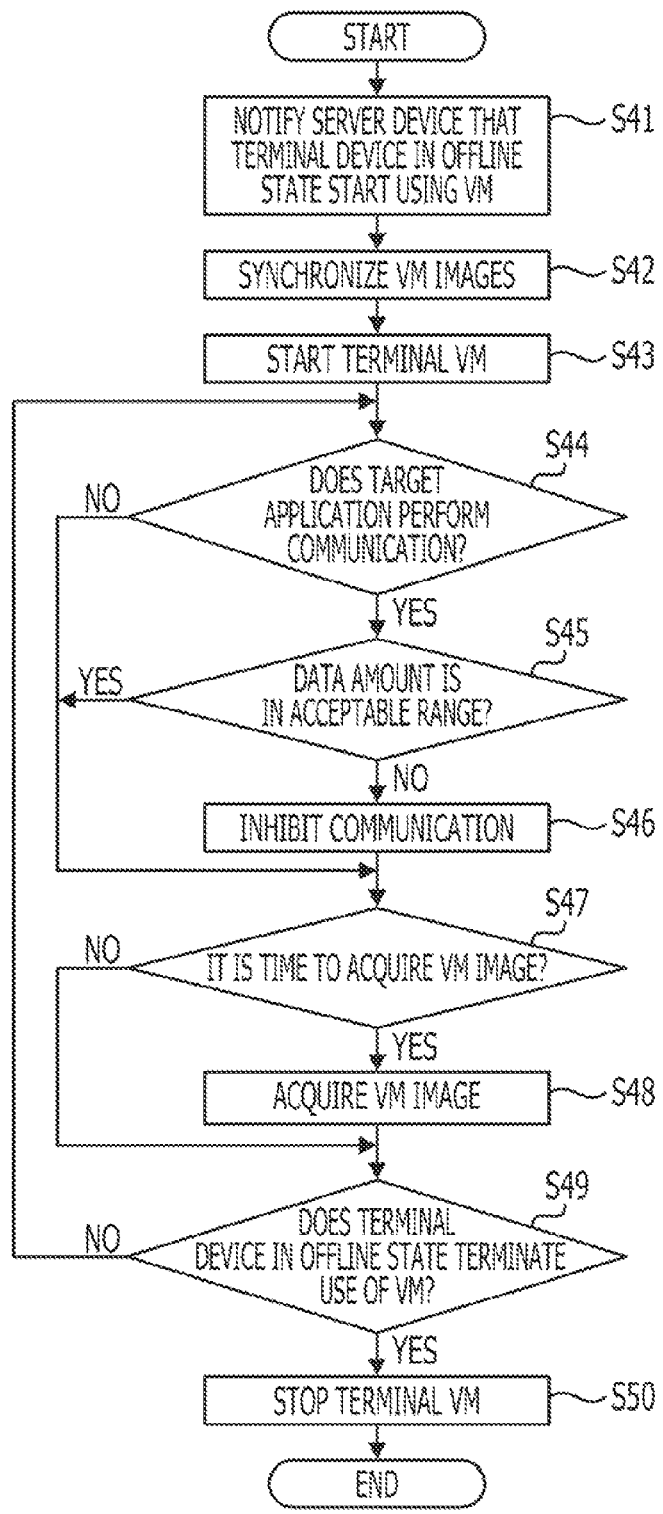
FIG. 11 is a flowchart of a process that is performed by the terminal device.

FIG. 11 is a flowchart of a process that is performed by the terminal device 2 in the offline state. FIG. 11 illustrates the process that corresponds to the process illustrated in FIG. 9.

The management OS 62 of the terminal device 2 notifies the server device 1 that the terminal device 2 in the offline state starts using the VM (in operation S41). The management OS 62 synchronizes the VM images between the terminal device 2 and the server device 1 (in operation S42). Next, the management OS 62 starts the terminal VM 63 (in operation S43). After the guest OS is executed on the terminal VM 63, the VMM 61 monitors an application that is executed on the guest OS. Then, the VMM 61 determines whether or not the application that is executed on the guest OS is the target application and performs network communication (in operation S44). When the target application does not perform the network communication (No in operation S44), operation S47 is performed. When the target application performs the network communication (Yes in operation S44), the VMM 61 acquires the data amount (of the difference image) included in the target application information, and determines whether or not the data amount is in an acceptable range (in operation S45).

When the data amount of the difference image is in the acceptable range (Yes in operation S45), the network communication that is performed by the target application is not inhibited, and operation S47 is performed. When the data amount of the difference image is not in the acceptable range (No in operation S45), the VMM 61 inhibits the network communication that is performed by the target application (in operation S46). The acceptable range used in operation S46 is set on the basis of the performance of the terminal device 2 or the usage states of the resources of the terminal device 2. Even when the server device 1 determines that the network communication causes a high load, the terminal device 2 determines that the terminal device 2 is capable of performing the network communication. Then, the terminal device 2 performs the network communication. Thus, the terminal device 2 inhibits the network communication in a flexible manner. In addition, when the terminal device 2 determines that the network communications are to be inhibited, the terminal device 2 inhibits the network communication so that it is possible to avoid preventing another process from being performed in the terminal device 2.

Next, the management OS 62 determines whether or not it is time to acquire a VM image of the terminal VM 63 (in operation S47). When the management OS 62 determines that it is not time to acquire the VM image of the terminal VM 63 (No in operation S47), the management OS 62 performs operation S49. When the management OS 62 determines that it is time to acquire the VM image of the terminal VM 63 (Yes in operation S47), the management OS 62 acquires the VM image of the terminal VM 63 (in operation S48). The management OS 62 determines whether or not the terminal device 2 in the offline state terminates the use of the terminal VM 63 (in operation S49). When the terminal device 2 in the offline state does not terminate the use of the terminal VM 63 (No in operation S49), the management OS 62 causes the terminal device 2 in the offline state to continuously use the terminal VM 63, and operation S44 is performed. When the terminal device 2 in the offline state terminates the use of the terminal VM 63 (Yes in operation S49), the management OS 62 stops the terminal VM 63 (in operation S50) and terminates the process.

As described above, in the present embodiment, when the application specified as the target application performs the network communication to access the management server device 3, the network communication is inhibited. Thus, when the terminal device 2 has low processing performance, for example, when the terminal device 2 is a PDA or the like, an application that performs a high-load process exclusively using most parts of the resources of the terminal device 2 does not affect another process. Therefore, a process is efficiently performed on the virtual computer regardless of performance of the device on which the virtual computer operates. In addition, since the terminal device 2 determines whether or not the network communication that is performed by the target application are to be inhibited, it is possible to inhibit the network communication on the basis of the performance of the terminal device 2 or the usage states of the resources of the terminal device 2. Therefore, the terminal device 2 inhibits the network communication in a flexible manner.

The present embodiment is described above. However, the aforementioned configurations and operations may be changed when desired or necessary and are not limited to the aforementioned embodiments. In the aforementioned embodiments, the application that periodically accesses the management server device 3 is specified as the target application. For example, a security application (such as a virus checking application) that periodically accesses a file may be specified as the target application. In addition, an application that is frequently executed may be stored as an application that is not specified as the target application, and the target application determining unit 524 may be configured so that the target application determining unit 524 does not specify, as the target application, the application that is frequently executed.

The programs described in the embodiments are stored in a computer-readable storage medium and delivered. Examples of the computer-readable storage medium are a flexible disk, a hard disk, a compact disc-read only memory (CD-ROM), a DVD-ROM, a DVD-random access memory (DVD-RAM), a Blue-ray disc (BD), a USB memory, and another nonvolatile memory such as a flash memory. The computer programs may be transmitted through at least one of networks represented by an electric communication line, a wireless or cable communication line, the Internet and the like. However, the examples of the computer-readable storage medium do not include a carrier wave that includes the computer programs. Even if the computer programs are included in a carrier wave and carried by the carrier wave, a computer that is a transmission source of the programs has a readable storage medium. Thus, the computer-readable storage medium is a physically tangible storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A first hardware computer on which a first virtual computer operates, the first hardware computer comprising:
    a memory, and
    a processor coupled to the memory and configured to:
        measure a load of an application program among a plurality of same application programs, when the application program is executed on the first virtual computer operating on the first hardware computer,
        determine, by comparing the load with a threshold, whether the application program has a level capable of executing on a second virtual computer operating on a second hardware computer whose processing performance is lower than a processing performance of the first hardware computer, and
        cause the second hardware computer to inhibit or postpone execution of the application program on the second virtual computer, when it is determined that the application program does not have a level capable of executing on the second virtual computer.

2. The first hardware computer according to claim 1, wherein the processor is further configured to:
    determine that the application program does not have the level capable of executing on the second virtual computer and specify the application program as a target application, when the load is substantially equal to or higher than the threshold, and
    transmit information of the target application to the second hardware computer.

3. The first hardware computer according to claim 2, wherein the processor is configured to:
    acquire a first snapshot of the first virtual computer at a first time;
    acquire a second snapshot of the first virtual computer at a second time different from the first time,
    acquire a difference between the first snapshot and the second snapshot as a difference image, and
    determine that the load is substantially equal to or larger than the threshold, when the acquired difference is substantially equal to or larger than the threshold.

4. The first hardware computer according to claim 3, wherein the processor is further configured to:
    synchronize the first snapshot and the second snapshot between the first hardware computer and the second hardware computer by transmitting the first snapshot and the difference image to the second hardware computer.

5. A system that constructed a virtual computer having an environment capable of executing a plurality of same application programs, the system comprising:
    a first hardware computer on which a first virtual computer operates, and
    a second hardware computer on which a second virtual computer operates, the second hardware computer having a processing performance lower than a processing performance of the first hardware computer,
    wherein the first hardware computer includes:
        a first memory, and
        a first processor coupled to the first memory and configured to:
            measure a load of an application program among a plurality of same application programs, when the application program is executed on the first virtual computer, and
            determine, by comparing the load with a threshold, whether the application program has a level capable of executing on the second virtual computer,
        wherein the second hardware computer includes:
            a second memory, and
            a second processor coupled to the second memory and configured to:
                inhibit or postpone execution of the application program on the second virtual computer, when it is determined that the application program does not have a level capable of executing on the second virtual computer.

6. A method for executing a process of a system including a plurality of hardware computers whose performances are different from each other, the system constructing a virtual computer having an environment capable of executing a plurality of same application programs on the plurality of hardware computers, the method comprising:
    measuring, by a first hardware computer among a plurality of hardware computers, a load of an application program among the plurality of same application programs, when the application program is executed on a first virtual computer operating on a first hardware computer of the system;

determining, by the first hardware computer and by comparing the load with a threshold, whether the first application program has a level capable of executing on a second virtual computer operating on a second hardware computer whose processing performance is lower than a processing performance of the first hardware computer; and inhibiting or postponing, by the second hardware computer, execution of the application program on the second virtual computer, when it is determined that the application program does not have a level capable of executing on the second virtual computer.

7. The method according to claim 6, wherein the determining includes determining that the application program does not have the level capable of executing on the second virtual computer and specifying the application program as a target application, when the load is substantially equal to or higher than the threshold, and wherein the method further comprises:

transmitting information of the target application to the second hardware computer.

8. The method according to claim 7, wherein the inhibiting includes inhibiting, by the second hardware computer, a network communication that is performed by the target application, when the target application performs the network communication.

9. The method according to claim 7, wherein the postponing includes lowering, by the second hardware computer, an execution priority of the target application, when the second virtual computer is to execute the target application.

10. The method according to claim 9, wherein the lowering includes:

executing an another process different from the target application on a priority basis; and executing the target application after the another process.

11. The method according to claim 6, wherein the determining includes:

acquiring a first snapshot of the first virtual computer at a first time;

acquiring a second snapshot of the first virtual computer at a second time different from the first time;

acquiring a difference image between the first snapshot and the second snapshot as the load; and determining that the load is substantially equal to or larger than the threshold, when the acquired difference is substantially equal to or larger than the threshold.

12. The method according to claim 11, further comprising:

synchronizing the first snapshot and the second snapshot between the first hardware computer and the second hardware computer by transmitting the first snapshot and the difference image to the second information device.

13. The method according to claim 6, wherein the determining includes:

determining whether the first application program has the level, by comparing the load with the threshold set based on the processing performance of the second hardware computer.

\* \* \* \* \*